United States Patent [19]

Darsey et al.

[11] Patent Number: 5,033,389
[45] Date of Patent: Jul. 23, 1991

[54] SYSTEM FOR GUIDING A VEHICLE FROM A REST POSITION TO A TARGET

[75] Inventors: Ralph J. Darsey, Lawrenceville; John W. Shea, Chamblee; Carl R. Taylor, Lawrenceville, all of Ga.

[73] Assignee: AT&T Bell Laboratories, Murray Hill, N.J.

[21] Appl. No.: 499,105

[22] Filed: Mar. 26, 1990

Related U.S. Application Data

[62] Division of Ser. No. 316,615, Feb. 28, 1989, Pat. No. 4,950,049.

[51] Int. Cl.⁵ .......................... F41G 7/32; F42B 15/04
[52] U.S. Cl. ..................................... 102/504; 89/1.34; 244/3.12
[58] Field of Search .................. 244/3.12; 102/504; 89/1.34; 242/172, 173, 128, 159

[56] References Cited

U.S. PATENT DOCUMENTS

| | | | |
|---|---|---|---|
| 2,200,720 | 5/1940 | Morin et al. | 242/73 |
| 2,639,097 | 5/1953 | Scott | 242/73 |
| 2,732,817 | 1/1956 | Robinson | 242/73 |
| 3,044,614 | 7/1962 | Hanscom | 242/73 |
| 3,114,456 | 12/1963 | Van Billiard | 242/159 |
| 3,156,185 | 11/1964 | Hermann et al. | 102/374 |
| 3,217,989 | 11/1965 | Vogel | 242/18 R |
| 3,266,423 | 8/1966 | Simpson | 244/3.12 |
| 3,319,781 | 5/1967 | Simpson et al. | 206/389 |
| 3,613,619 | 10/1971 | de Nobel et al. | 244/3.12 |
| 3,783,180 | 1/1974 | Splicer | 174/110 R |
| 3,980,390 | 9/1976 | Yamamoto et al. | 350/96.33 |
| 4,209,229 | 6/1980 | Rittler | 350/96.34 |
| 4,243,298 | 1/1981 | Kao et al. | 350/96.33 |
| 4,326,657 | 4/1982 | Arpin et al. | 226/97 |
| 4,344,669 | 8/1982 | Uchida et al. | 350/96.30 |
| 4,418,984 | 12/1983 | Wysocki et al. | 350/96.33 |
| 4,444,458 | 4/1984 | Stowe et al. | 350/96.15 |
| 4,444,460 | 4/1984 | Stowe | 350/96.20 |
| 4,448,484 | 5/1984 | Lombardi et al. | 350/96.23 |
| 4,553,815 | 11/1985 | Martin | 350/96.23 |
| 4,733,941 | 3/1988 | Broer et al. | 350/96.33 |
| 4,738,511 | 4/1988 | Fling | 350/96.15 |
| 4,778,244 | 10/1988 | Ryan | 350/96.23 |
| 4,798,346 | 1/1989 | Myers et al. | 242/18 A |
| 4,838,643 | 6/1989 | Hodges et al. | 244/3.12 |
| 4,903,607 | 2/1990 | Clark | 244/3.12 |
| 4,907,763 | 3/1990 | Pinson | 244/3.12 |

Primary Examiner—David H. Brown
Attorney, Agent, or Firm—E. W. Somers

[57] ABSTRACT

An optical fiber package (52) includes a length of optical fiber (22) wound in a plurality of convolutions on a bobbin (50). In order to maintain the convolutions in a precision wound package and to prevent snags during payout, it is necessary that each convolution of optical fiber be adhered to at least a portion of an adjacent convolution. This is accomplished by providing the length of optical fiber with an adhesive material (32) which is not tacky at room temperature but which becomes tacky at a predetermined temperature. After the convolutions have been wound on the bobbin, the bobbin is treated to cause the adhesive material to become tacky and cause each convolution to adhere to at least a portion of adjacent convolutions. Suitable adhesion is caused to occur with any adhesive material for which molecular bonding can occur across the interface between contiguous portions of adjacent convolutions as a result of suitable treatment. The adhesion between convolutions is sufficient to cause a precision wound package to be maintained, but is such as to allow separation of each convolution from an adjacent convolution during payout without the occurrence of breaks.

3 Claims, 4 Drawing Sheets

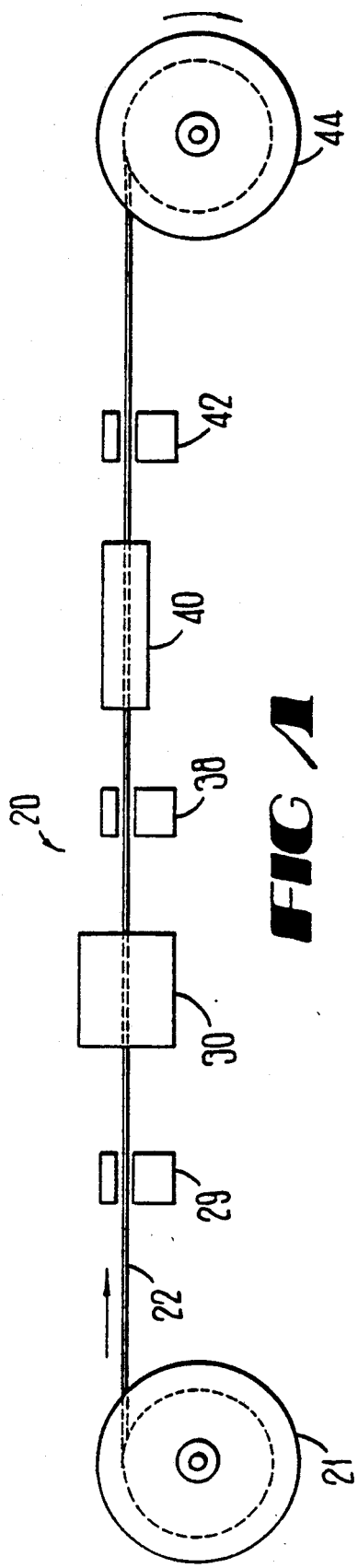
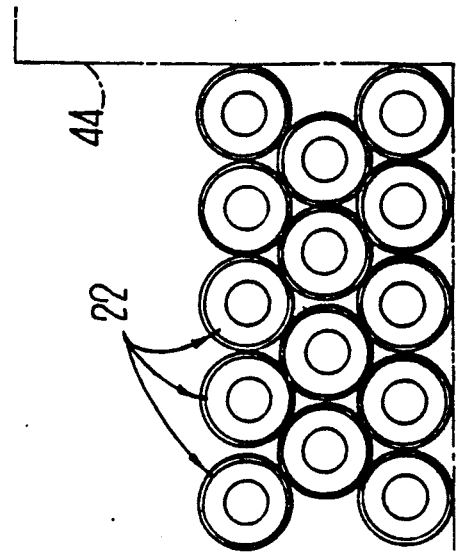
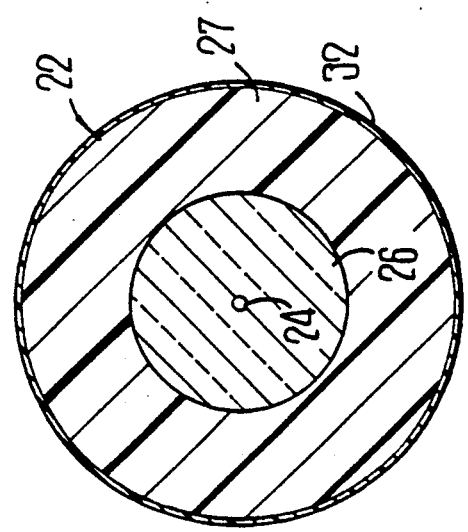

SYSTEM FOR GUIDING A VEHICLE FROM A REST POSITION TO A TARGET

This is a division of application Ser. No. 07/316,615 now U.S. Pat. No. 4,950,049 filed Feb. 28, 1989.

TECHNICAL FIELD

This invention relates to a system for guiding a vehicle from a rest position to a target. More particularly, it relates to a system for guiding a vehicle comprising an optical fiber package comprising a plurality of convolutions which are secured together prior to payout from the package.

BACKGROUND OF THE INVENTION

Optical fiber has become a widely accepted form of transmission media. The use of optical communications involving the use of optical fibers has grown at an unprecedented pace. A continuous length of the fiber is drawn from an optical preform which may be made by any one of several known processes. Afterwards, or as part of a tandem process, the drawn fiber is coated, cured, measured and taken up, desirably in an automatic takeup apparatus, on a spool. Methods and apparatus for taking up optical fiber are disclosed and claimed in U.S. Pat. No. 4,798,346 which issued on Jan. 17, 1989 in the names of D. L. Myers and J. W. Wright. Typically, an optical fiber has a diameter on the order of 125 microns, and is covered with a coating material which increases the outer diameter of the coated fiber to about 250 microns, for example.

The spool on which the optical fiber is taken up has other uses. It is used to store the optical fiber, to pay out and to take up the fiber for other operations such as ribboning, cabling, and rewinding and is used to ship optical fiber which is wound thereon to other companies which further process the fiber. Also, it may be used in weapons and communications systems in which it may be attached to a control station.

Weapons and communications systems which use an optical fiber for two-way data communication between two or more moving bodies or between a moving body and a guidance station have been developed or ar under development. Such uses include communication lines between aircraft, between an aircraft and a ship, and between a projectile, such as a missile, and a control station at a launch site, for example. Advantageously, the use of optical fiber for these kinds of communication precludes electomagnetic interference and undesired interception. There are, however, certain disadvantages, not present in other other forms of communication in using optical fiber. Optical fiber is less robust than metallic conductors, rendering it subject to breakage. Aside from breakage, optical fiber communication performance may be degraded by microbends in the fiber which are generated by bending or by other stresses to which the fiber is subjected. Such damage to an optical fiber not only reduces the long-term durability of the fiber, but also causes losses in the strength and in the content of the optical signal.

A typical optical fiber application in a weapons systems involves the packaging of a continuous length of optical fiber on a carrier bobbin which is positioned inside a vehicle. Such a vehicle commonly is referred to as a tethered vehicle. One end of the fiber is attached to operational devices in the vehicle, whereas the other end of the fiber is connected to a control or communications station at the launch site. During and after launch, two-way communication with the vehicle is conducted.

In order to use such an arrangement, there must be provided a reliable and compact package of the optical fiber which may be disposed within the vehicle and which will permit reliable deployment of the optical fiber during the flight of the vehicle. The use of metallic conductors for guidance or control of launched vehicles is known. See, for example, U.S. Pat. Nos. 3,114,456, 3,156,185 and 3,319,781. As mentioned hereinabove, the characteristics of optical fiber present difficulties not involved in the use of metallic conductors for communication. Specialized treatment is required to facilitate the unwinding of the optical fiber its carrier bobbin at a relatively high rate of speed.

One problem is that the introduction of optical fiber for use in more hostile environments, such as in underwater cable or in military applications, has required that more stringent requirements be imposed on the physical properties of the fiber. Additionally, extremely long lengths of fiber may be required and may be obtained by splicing a plurality of lengths which are obtained using current manufacturing techniques. For these and other applications, splicing, in which the coating material is removed from end portions of two fibers which are then fused together end to end, provides a suitable means for joining the ends of two glass fibers with an acceptable loss.

Bared spliced fiber end portions must be recoated, maintaining stringent requirements on dimensional and strength parameters associated with the coated fiber. Typically, the recoating material contacts the adjacent originally coated portions of the spliced fibers along substantially radial planes exposed when the original coating material was removed from the end portions and along overlapping portions of the outer surface of the original coating material adjacent to the radial planes. The coating material is then cured to yield a recoated splice section with a transverse cross section which is larger than that of the optical fiber having the original coating material thereon.

In a typical tethered vehicle, an optical fiber which is wound on a payoff device and connected to a guidance system is payed off as the vehicle is moved. For tethered vehicles, the winding of the optical fiber on the payoff device must be accomplished in a precision manner. Otherwise, payoff could be disrupted. It has been found that if the cross section of the recoated spliced portion transverse of the longitudinal axis of the optical fiber is not the same as that of the optical fiber as originally coated, the winding pattern on the payoff device in all likelihood is not uniform. This will cause problems in fiber payoff following the launch of the tethered vehicle. This problem has been solved. A recoated splice having the same transverse cross section as that of the unspliced fiber has been attained by the use of methods and apparatus disclosed in application Ser. No. 133,579 which was filed on Dec. 16, 1987 in the names of R. J. Darsey, et al.

Another problem in the optical fiber guidance of tethered vehicles relates to the successful unwinding of the fiber from a carrier bobbin as the bobbin is propelled along with the vehicle. The leading end of the optical fiber is connected to a guidance system for controlling the path of travel of the vehicle. It becomes important for the optical fiber to be payed off from the bobbin without the occurrence of snags, otherwise the fiber may break and the control system rendered inoperable.

Contributing to the successful payout of the optical fiber is a precision wound package. Further, not only must the convolutions be wound with precision, they also must remain in place as wound during handling and when deployed. In other words, the optical fiber package must be a highly stable one. On the other hand, payout must occur easily without the necessity of high pulling forces to remove each convolution of fiber from the carrier bobbin.

In optical fiber packages for use in tethered vehicles, as many as thirty layers of optical fiber are wound on a base layer of wire. An adhesive material between the optical fiber turns functions to hold the package together, forming a stable structure which is resistant to environmental extremes, shock and vibration. Desirably, the adhesive material which is used to hold together the convolutions must have a minimal impact on the optical performance of the wound optical fiber, and yet it must allow the optical fiber to be payed out with a controlled force at the peel-off point as the outermost turn is unwound at high speed. These requirements present somewhat conflicting requirements for the adhesive system.

During storage and transport of the carrier bobbin, mechanical stability is most important as the adhesive adds integrity to the wound package thereby maintaining the package in a ready condition for deployment. During deployment, both mechanical and optical effects are significant. The adhesive system must provide tackiness which is sufficiently low to permit a helical pattern of payout at speeds which may be relatively low to speeds which may be in the supersonic range. Excessive tackiness threatens fiber integrity by forming an extreme bend at the peeloff point. On the other hand, not enough tack may result in failure through dynamic instability on the bobbin surface. With respect to optical performance, optical attenuation at the peel offpoint of each successive convolution may occur through localized macrobending, degrading the integrity of data and video transmission. Typical peel-off point attenuation of each successive convolution may contribute 3 or more dB to the overall loss.

Also, it has been found that microbending in the layers of undeployed fiber in the bobbin during deployment can affect adversely optical performance. It has been found that the adhesive material can contribute significantly to attenuation increases, especially at lower temperatures.

Current techniques for providing a sought-after stable package include the coating of each layer of fiber convolutions as they are or after they have been wound on the bobbin. In the prior art, at least one system includes a spraying apparatus. The apparatus is used to apply a wet adhesive to the optical fiber convolutions as they are wound on a bobbin. Depending on how the adhesive of this system is applied, the application may not be duplicatable from one bobbin to another. Needless to say, this is an expensive procedure necessitating perhaps the interruption of the winding operation after each layer to allow the coating to cure or solvent to evaporate.

Another technique involves the winding of the convolutions on a carrier bobbin followed by the impregnation of the wound fiber with a curable material having a low tear strength. When the impregnating material cures, it gels and holds the convolutions together in a precision wound package. During payout, the cured material is torn apart, releasing each convolution from its neighbor. The force developed during payout is related to the tear strength of the cured material.

What still is needed are a system which includes more reliable, precision wound bobbins of optical fiber in which the convolutions of fiber are held together by an adhesive material. The adhesive material should be such that it stabilizes the package yet permits payout at relatively high speeds. Further, the process should be easily repeatable from one bobbin to another.

SUMMARY OF THE INVENTION

The foregoing problems of the prior art have been solved by the system of this invention. An adherent elongated strand material includes a length of elongated strand material such as optical fiber which is capable of being disposed in a configuration such that a portion of an outer surface becomes juxtaposed to an adjacent surface to which said portion of said outer surface of the elongated strand material is to become adhered. The adjacent surface may be another portion of the strand material. A layer of an adhesive material encloses the outer surface of the elongated strand material and which along at least the portion of the outer surface is adapted upon suitable treatment to bond molecularly across an interface with another portion of an adhesive material which has been applied to the adjacent surface. To bond molecularly is intended to mean the joining of contiguous faces of adjacent surfaces along an interface therebetween through chain or material interpenetration which does not involve chemical bonding or material interpenetration that may occur with chemical bonding or any other form of coupling that can result in an attractive force between the two surfaces.

The length of optical fiber may be disposed in a plurality of convolutions such that at least a portion of each convolution is adjacent to at least a portion of another convolution. The outer surface of the optical fiber has been precoated with an adhesive material. Upon suitable treatment, the adhesive material across an interface between portions of the adhesive material on contiguous portions of the optical fiber bond molecularly. Other portions of the outer surface outside bonded regions are characterized by a relatively low coefficient of friction.

A stable package of optical fiber is provided by moving an optical fiber along a path of travel. An adhesive material is applied to the optical fiber as it is moved along the path of travel. Afterwards, the adhesive material on the optical fiber is caused to be non-tacky and the optical fiber having the adhesive applied thereto is taken up in a plurality of precision wound convolutions on a bobbin. The adhesive material is such that it is in a non-tacky state while it is at room temperature but is such that it is capable of being treated to become tacky. Subsequently, the optical fiber is treated to cause the adhesive material to become tacky to hold the convolutions together. The level of adhesion is optimized to provide a stable package without impacting adversely on the tangle-free payout of the optical fiber.

In a preferred embodiment, the adhesive material is applied on one manufacturing line after which the optical fiber is rewound into a tight package. This allows the application of adhesive material to be performed at a much higher speed than if the application were accomplished in tandem with the slower, precision winding operation.

In a apparatus for providing a precision wound, stable bobbin of optical fiber, a length of optical fiber is payed out from a supply spool and passed through an application device. The application device is effective to apply an adhesive material to the optical fiber. Then the adhesive material is caused to be non-tacky after which it is taken up in a relatively loose manner on an intermediate, process spool. The optical fiber on the process spool is payed off and taken up in a precision wound, tight manner on a carrier bobbin. Afterwards, the carrier bobbin with the optical fiber thereon is positioned in a chamber and treated to activate the adhesive material and to cause it to bond together portions of adjacent convolutions and thereby provide a stable package.

BRIEF DESCRIPTION OF THE DRAWING

Other features of the present invention will be more readily understood from the following detailed description of specific embodiments thereof when read in conjunction with the accompanying drawings, in which:

FIG. 1 is a schematic view of a manufacturing line which is used to apply an adhesive material to optical fiber the FIG. 2 is a cross sectional end view of an optical fiber which is provided with a coating and with a layer of an adhesive material;

FIG. 4 is a cross sectional end view of a portion of a process spool having a plurality of convolutions wound loosely thereon;

DETAILED DESCRIPTION

Figure 3:
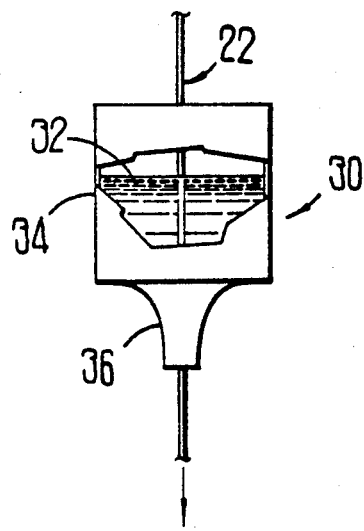
FIG. 3 is a schematic view of a portion of the line of FIG. 1.

Referring now to FIG. 1, there is shown schematically a manufacturing line which in part is used to provide an adhesive-coated elongated strand material such as optical fiber, for example. The adhesive-coated optical fiber is used to provide a stable, precision wound package of optical fiber. The line is designated generally by the numeral 20 and includes a spool 21 of coated optical fiber 22 (see FIG. 2). As can be seen in FIG. 2, the optical fiber 22 includes a core 24, a cladding 26 and a coating 27. Instead of a single coating layer 27, dual layers may be used, as is well known in the art. Typically, the outer diameter of the coated optical fiber 22 is 250 μm. Hereinafter, the term optical fiber is used and is intended to designate the optical fiber with it single or dual protective coatings thereon.

As is seen in FIG. 1, the optical fiber 22 is payed out from the supply spool 21 and is advanced along a path of travel which in a preferred embodiment shown in FIG. 3 is oriented vertically and through a diameter measuring gauge 29. The diameter measuring gauge 29 is available commercially such as one designated Lasermike ® micrometer and available from the Techmet Company.

Afterwards, the coated optical fiber is advanced through an applicator which is designated generally by the number 30. The applicator 30 functions to apply an adhesive material 32 to the coated optical fiber. In a final package of wound optical fiber, it is the adhesive material which holds the convolutions together before the optical fiber is payed out.

The applicator 30 includes an application cup 34 (see FIG. 3) which holds a bath of the adhesive material 32 in liquid form. After each successive increment of length of the optical fiber is moved through the bath, it is moved through a sizing die 36. The sizing die 36 may be a rigid die, or it may be a flexible tip. The die is sized to cause the optical fiber having the adhesive material 32 applied thereto in a layer as it emerges from the applicator 30. If it is a flexible tip, the inner diameter of the tip may be changed by a collet or an iris type arrangement similar to one described in U.S. Pat. No. 4,370,355 which issued on Jan. 25, 1983 to P. J. Niesse and which is incorporated by reference hereinto.

Any number of adhesive materials may be applied to the optical fiber to provide the stable package. For example, a thermoplastic material, either amorphous or semi-crystalline, a hot melt material, a thermosetting material, or a wax or other materials that can form interfacial bonding by heat treatment or by time or solvent exposure may be used. In the preferred embodiment, the adhesive material is a polyvinyl butyral plastic material. The adhesive material also may be a solder.

What is important is that the adhesive material must meet particular requirements. It must be capable of being applied to an optical fiber preferably in a liquid state and then caused to be tack-free when it is wound on a process spool. Also, the adhesive material must be capable of being treated subsequently so that it develops adhesive bonds between at least portions of adjacent convolutions of the optical fiber which are wound on a carrier bobbin. The bonding must be such not only that the resulting optical fiber package is stable, but also, it must allow the optical fiber convolutions to be payed off from a carrier spool without damage to the fiber.

In the preferred embodiment, as mentioned hereinabove, the adhesive material is a polyvinyl butyral. The bath in the applicator 30 comprises a mixture comprising polyvinyl butyral and a solvent. In the preferred embodiment, the solvent is methyl ethyl ketone.

Following the application of the above-described mixture to the optical fiber, the optical fiber is moved through a concentricity measuring gauge 38 (see FIG. 1) and then through an apparatus 40 which causes the adhesive material to be in a non-tacky solid state. For the polyvinyl butyral mixture, the apparatus 40 causes the mixture to be dried. However, if a hot melt adhesive material were to be applied, then the apparatus 40 may be used to cool the adhesive material. For the preferred embodiment, the drying apparatus 40 is designed to dry the liquid adhesive mixture on the optical fiber to cause the fiber to be tack-free to allow it to be wound loosely on a takeup.

The drying apparatus of the preferred embodiment may include a PYREX ® glass tube through which the optical fiber is moved. The PYREX ® tube is disposed in a chamber wherein it is subject to intense radiation provided by a quartz halogen lamp. The tube absorbs the radiant energy from the lamps and itself becomes an infrared (IR) emitter. The IR radiation is the source of radiation for drying the adhesive material which has been applied in the bath 30.

After the drying of the adhesive material on the optical fiber has been accomplished, each successive increment of length is moved through another diameter measuring device 42 (see again FIG. 1). Then the optical fiber is wound in a plurality of convolutions on a process spool 44. The winding on the process spool 44 is accomplished so that the optical fiber is somewhat loosely wound thereon (see FIG. 4). Typically the tension on the optical fiber as it is wound loosely on the intermediate process spool 44 is about 30 to 40 grams.

Figure 5:
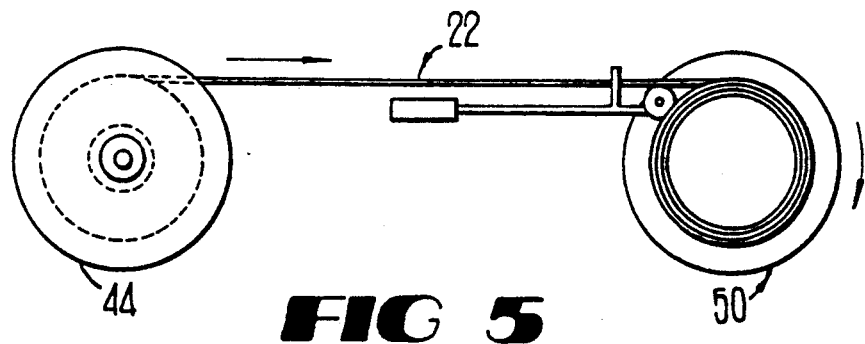
FIG. 5 is a schematic view of the transfer of optical fiber from loosely wound convolutions on the process spool to a precision tightly wound package on a carrier bobbin.
Figure 6:
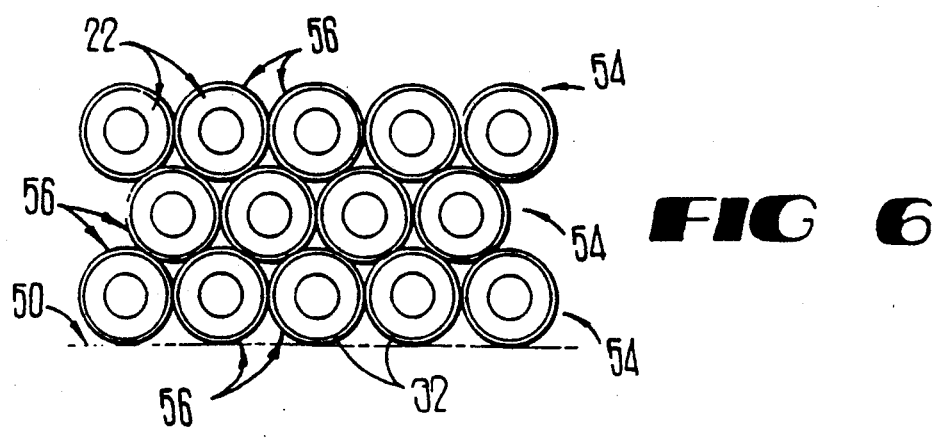
FIG. 6 is a view of a portion of an optical fiber package comprising convolutions of optical fiber wound on the carrier bobbin.

Then the spool 44 of loosely wound optical fiber and another spool which is designated a deployment or carrier bobbin and which is designated by the numeral 50 are arranged for a rewind operation (see FIG. 5). Generally, the bobbin 50 may be made of a metallic, plastic or a composite material and has a hub which is tapered slightly from a flange 51. During that operation, the optical fiber is rewound from a plurality of loosely wound convolutions to a precision wound package 52 comprising a plurality of layers 54-54 (see FIG. 6) each comprising a plurality of tightly wound convolutions 56-56. For this rewinding operation, the tension in the optical fiber is about 100 grams. The precision winding operation which may be carried out in a process such as is shown in U.S. Pat. No. 4,746,080, for example, is time consuming, being accomplished at a relatively low line speed. On the other hand, the line speed during the application of the adhesive material to the optical fiber is at least several meters per second. If the adhesive material were to be applied in tandem with the precision winding, a lower line speed would be necessary. The two step adhesive application-precision wind process of the preferred embodiment is more efficient from a manufacturing standpoint.

Of course, it should be realized that the optical fiber having the layer of adhesive material thereon may be caused to be disposed in convolutions not wound on a spool or bobbin. Such a package may very well be payed out from a center point rather than from outer portions of the package. Or the convolutions of optical fiber having the adhesive material applied thereto may be wound on a collapsible arbor (not shown), after which the arbor is removed to provide a stable package.

Figure 7:
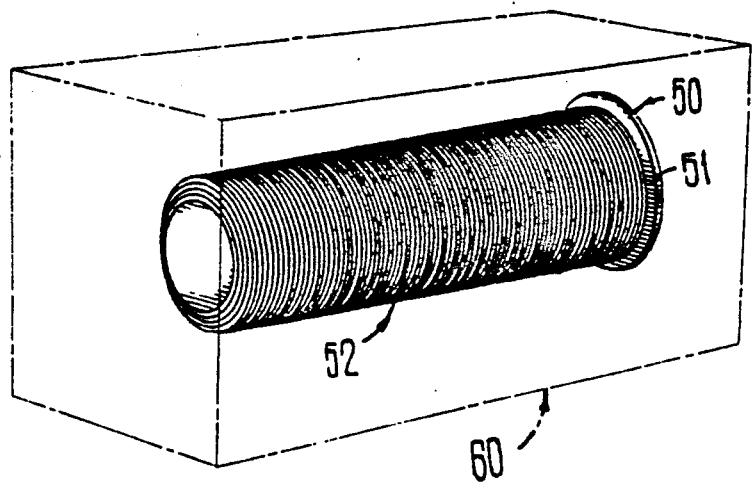
FIG. 7 is a schematic view of apparatus which is used to treat the adhesive material on convolutions of the optical fiber after the optical fiber has been wound on the carrier bobbin.

Following the rewind operation, the precision wound package 52 of optical fiber is treated to activate the adhesive material and to cause at least portions of adjacent convolutions to bond molecularly to each other. The bobbin 50 of packaged optical fiber is positioned in a treating facility 60 (see FIG. 7) wherein the adhesive material is treated to develop bonds between contiguous portions of the convolutions of the optical fiber.

Figure 8:
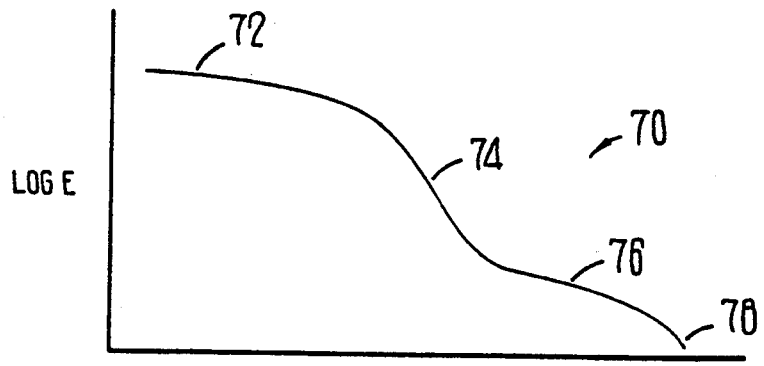
FIG. 8 is a graph which depicts the behavior of one parameter of a thermoplastic material as it is subjected to heat treatment.

Referring now to FIG. 8, there is shown a curve 70 which depicts the modulus behavior of a thermoplastic material. At room temperature, or in the range of temperatures in which the optical fiber is used, i.e. less than about 70° C., the material is in a glassy zone which is designated generally by the numeral 72. At that time, it is non-tacky. Then, as the temperature increases, the modulus decreases, descends through a transition zone 74 and subsequently becomes rubbery along portions 76 and 78. The degree of tack depends on the length of time during which the thermoplastic material is exposed to elevated temperatures and the values of these temperatures. Bonding is enhanced by causing the composite material to be heated in the range shown for these portions 74, 76, or 78 of the graph, depending on the amount of bonding which is desired. For some materials, bonding in the transition zone may be sufficient.

Referring now to FIGS. 9-12, there are shown a sequence of views which depict the formation of modular bonds across an interface 80 between the adhesive material on one convolution and that on another convolution. For a thermoplastic material, molecular bonding occurs following the interpenetration or migration of chains of which the plastic material is comprised across interfacial boundaries between contiguous portions of the adhesive material on adjacent convolutions.

Figure 10:
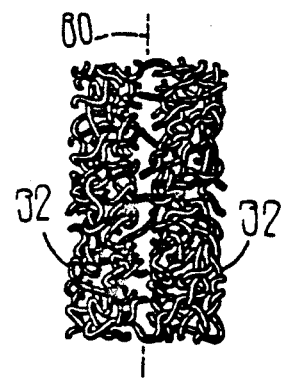
Figure 11:
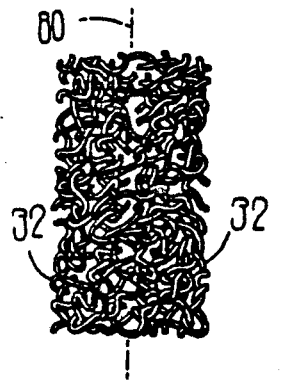
Figure 12:
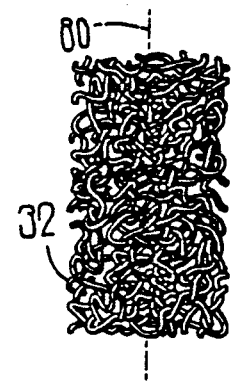

The amount of bonding is related to the amount of chain penetration that occurs across the contiguous portions of the convolutions. Also, the amount of bonding increases for increasing temperatures to which the adhesive material is exposed or to increasing time during which it is exposed at a given temperature. FIGS. 10-12 illustrate increased bonding as the temperature passes through the regions 74, 76 and 78. The required amount of bonding for a particular application will determine the time or temperature or both to which the optical fiber is exposed.

Figure 9:
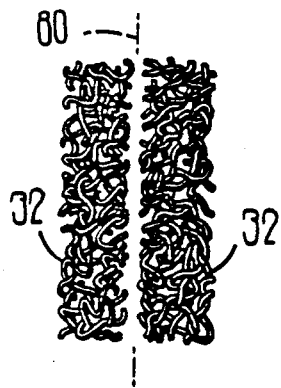
FIGS. 9-12 are a series of enlarged views which are schematic of the molecular level of an interface between adhesive material on contiguous convolutions of the optical fiber wound on a bobbin as the interface steps through transitional stages to a stage wherein there is an interfacial bond between adhesive material on portions of adjacent convolutions.

Because of the bonding or molecular migration, as it is often termed, across the interfaces as can be traced by comparing FIGS. 9-12, the convolutions of the optical fiber are held together. As is seen in FIG. 9, portions of the adhesive material 32 are not bonded across the interface 80 prior to treatment in the apparatus 60. When subjected to the treating apparatus 60, the adhesive material on contiguous portions of the adjacent convolutions on the bobbin 50 begin to develop molecular bonds across the interface 80 (see FIG. 10). After exposure to a predetermined temperature for a predetermined time, sufficient molecular bonding across the interface 80 is established (see FIGS. 11-12) to hold together the convolutions. As a result, a stable package of wound fiber is provided. It may be handled with confidence so that the convolutions will remain in place. However, the bond is not so great as to impede payoff of the optical fiber from the bobbin. At the expected tension levels, each successive convolution separates from adjacent convolutions without any damage to the optical fiber occurring. It must be recognized that it is only at the contact points between adjacent convolutions that molecular migration occurs to establish bridging chains across the interface.

What is important is that suitable adhesion can be caused to occur with any adhesive material for which molecular bonding can occur across an interface between contiguous portions of adjacent convolutions as a result of suitable treatment. Such materials include a thermosetting material, a holt melt adhesive material or a thermoplastic material, either amorphorous or semicrystalline. During suitable treatment of any of these materials, molecular migration across the interfaces between contiguous portions occurs. Upon cooling, a molecular bond is established across that interface to hold the convolutions securely in place.

For polyvinyl butyral, the treating temperature range is about 70° C. to about 120° C. For other suitable materials, the treatment temperature range may be different, but is generally above 70° C. That time or temperature or that desired level of bonding will be based on the properties of the adhesive material used.

The treating temperature may be provided by a number of suitable apparatus. For example, the facility could include an oven or a microwave heating facility. Microwave energy may be caused to couple to the adhesive material to heat it. When microwave energy is used to increase the temperature of the adhesive material, the bobbin 50 is made of a nonmetallic material. In another technique, a vacuum may be used to withdraw air from interstices between the convolutions. A vapor or liquid material is introduced to cause contacting portions of convolutions to stick together. Then vacuum is reapplied to remove the excess material.

By controlling the degree of tack between the convolutions on the precision wound bobbin 50, damage to the fiber during high speed unwinding is avoided. Of course, the tack time and temperature will depend on the particular adhesive material which is applied to the optical fiber.

For a thermoplastic material at the interface between adjacent convolutions, the transition of the thermoplastic material as shown in FIG. 8 is reversible. As the adhesive material cools, the region of bonding along contiguous portions of adjacent convolutions is immobilized or frozen in and is stable with time. When the optical fiber is cooled to ambient temperatures, the interfacial bonding is preserved at levels achieved during the higher temperature exposure. Those portions of the surface which are not bonded return to a glassy state, as can be seen from FIG. 8. The use of a glassy, adhesive material which is tack-free at room temperature facilitates high speed, uniform coating of optical fiber and the winding of convolutions thereof on a bobbin. The adhesion is generated and controlled by the tacking of the thermoplastic material in the transition and/or rubbery zones.

The return of those quadrants of the adhesive material on the optical fiber which are not contiguous to portions of adhesive material on adjacent convolutions to a glassy state upon cooling is beneficial. These surfaces are characterized by a relatively low coefficient of friction. These low coefficient of friction, glassy surfaces facilitate the high speed payout of the optical fiber. If the surfaces were not so characterized, payout, which involves portions of each convolution sliding over a portion of a surface of other convolutions, may cause some of the adjacent convolutions to become dislodged prematurely and cause package disruption. This undesired occurrence may become manifested in the payout of multiple convolutions which could lead to entanglements. This is especially likely to happen when those convolutions adjacent to the flange 51 of the bobbin 50 are payed out in a direction generally parallel to a longitudinal axis of the bobbin and toward an unflanged end thereof. Advantageously, the low coefficient of friction portions of the surfaces of the convolution which are not bonded molecularly avoids multiple payout with each convolution being pulled easily over surfaces of other convolutions.

Figure 13:
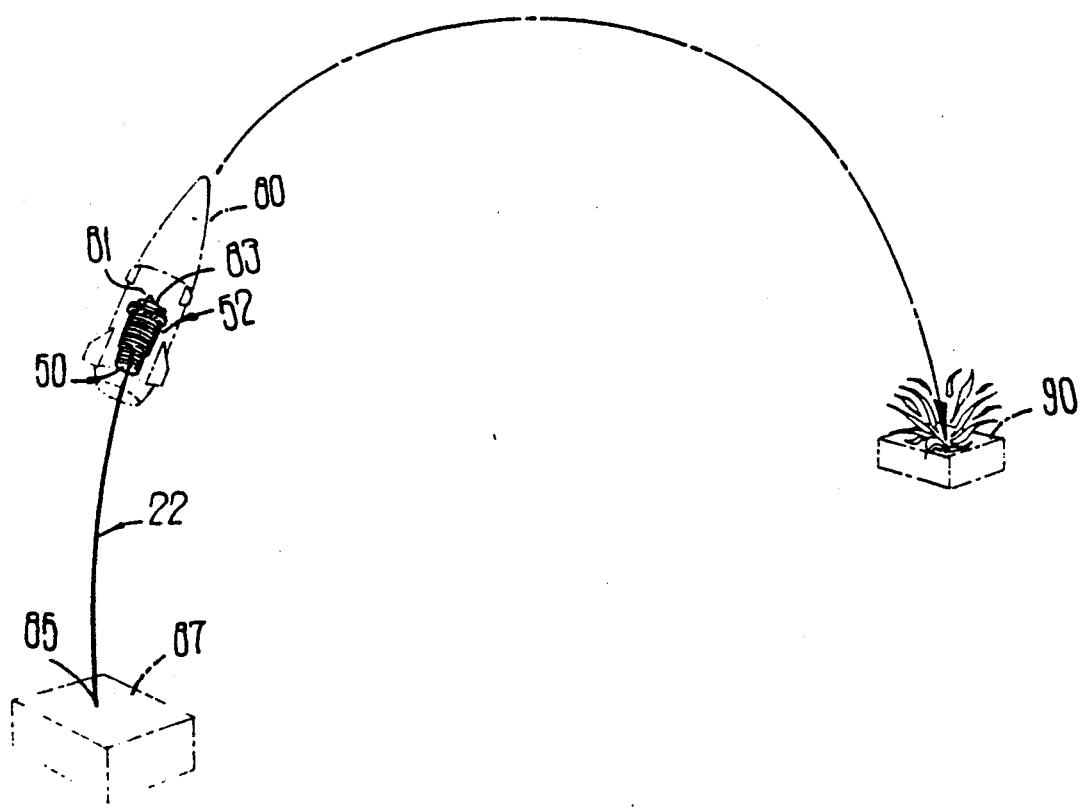
FIG. 13 is a schematic view which shows a use of the stable package of the system of this invention.

The precision wound optical fiber package 52 may be used, for example, to control the flight path of a missile. In such an environment, a bobbin 50 with the optical fiber wound thereon is mounted in a missile 80 (see FIG. 13). An inner end 81 of the optical fiber is connected to devices 83 within the missile and a leading end 85 of the fiber is connected to a control station 87. Following the launching of the missile, the flight path may be controlled by the control station 87 which communicates with the missile 80 through the optical fiber 22. As the missile moves from the control station 87 to a target 90, the optical fiber is payed off from the unflanged end of the bobbin 50 to maintain communications between the control station and the missile.

It is to be understood that the above-described arrangements are simply illustrative of the invention. Other arrangements may be devised by those skilled in the art which will embody the principles of the invention and fall within the spirit and scope thereof.

We claim:

1. A system for guiding a vehicle from a rest position to a target, said system comprising:
    a control system;
    a vehicle which is capable of being caused by said control system to move from a rest position to a target; and
    an optical fiber package, which comprises:
        a length of optical fiber which is disposed in a plurality of convolutions such that at least a portion of each convolution is adjacent to at least a portion of another convolution, said package being such that one end of said optical fiber is connected to said control system and the other end is connected to said vehicle; and
        a layer of an adhesive material which encloses each increment of length of said optical fiber and which upon suitable treatment bonds molecularly across an interface between portions of the adhesive material, wherein said adhesive material on contiguous portions of said optical fiber being adhered together by molecular bonds and wherein the adhesive material on the optical fiber other than that which bonds molecularly to hold the convolutions together includes an outer surface which is characterized by a relatively low coefficient of friction.

2. The system of claim 1, wherein said adhesive material is selected from the group consisting of a thermoplastic material, a hot melt material, a thermosetting material, solder and a wax.

3. The system of claim 1, wherein said adhesive material comprises a mixture of a polyvinyl butyral plastic material and a solvent.

* * * * *